United States Patent [19]

Sedy

[11] 4,290,611
[45] Sep. 22, 1981

[54] HIGH PRESSURE UPSTREAM PUMPING SEAL COMBINATION

[75] Inventor: Josef Sedy, Glenview, Ill.

[73] Assignee: Crane Packing Co., Chicago, Ill.

[21] Appl. No.: 135,925

[22] Filed: Mar. 31, 1980

[51] Int. Cl.³ .............................................. F16J 15/16
[52] U.S. Cl. ...................................... 277/27; 277/134; 277/135
[58] Field of Search .................... 277/59, 15, 65, 3, 27, 277/134, 135

[56] References Cited

U.S. PATENT DOCUMENTS 3,834,715  9/1974  Butler ..................................... 277/59
3,894,741  7/1975  McHugh .............................. 277/59
3,943,717  3/1976  Schexnayder ........................ 277/59

Primary Examiner—Robert I. Smith
Attorney, Agent, or Firm—Dorsey L. Baker

[57] ABSTRACT

This specification discloses a dual seal combination for sealing the space between a housing and a shaft which passes through the housing. The combination is formed of an inboard seal and an outboard seal which are axially spaced from one another to define a buffer zone containing a buffer fluid. The inboard seal has radial faces provided with pumping grooves for sealing high pressure and for pumping buffer fluid from the buffer zone towards the upstream or high pressure side of the seal to lubricate the seal faces and to insure against leakage of fluid.

12 Claims, 6 Drawing Figures

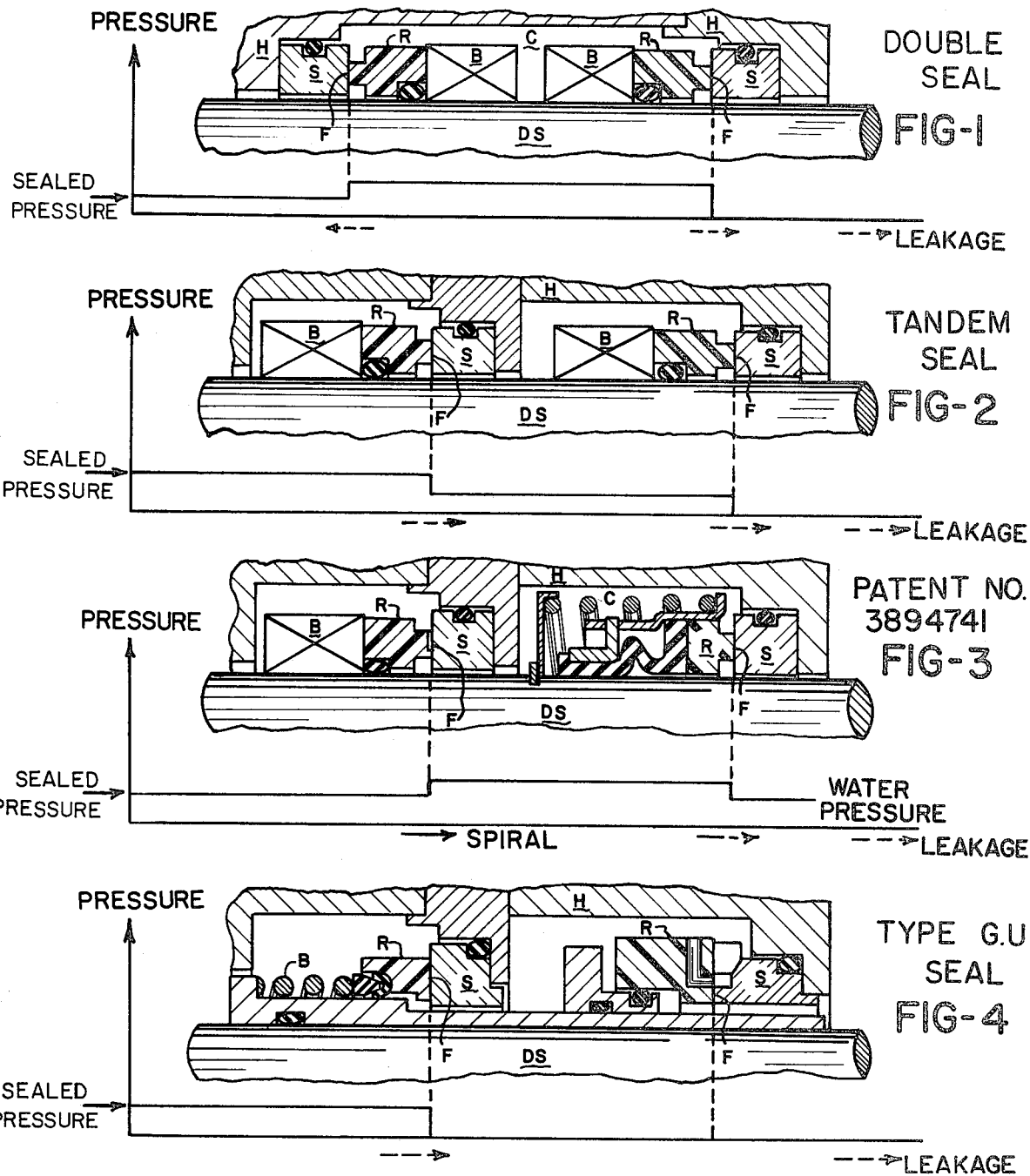

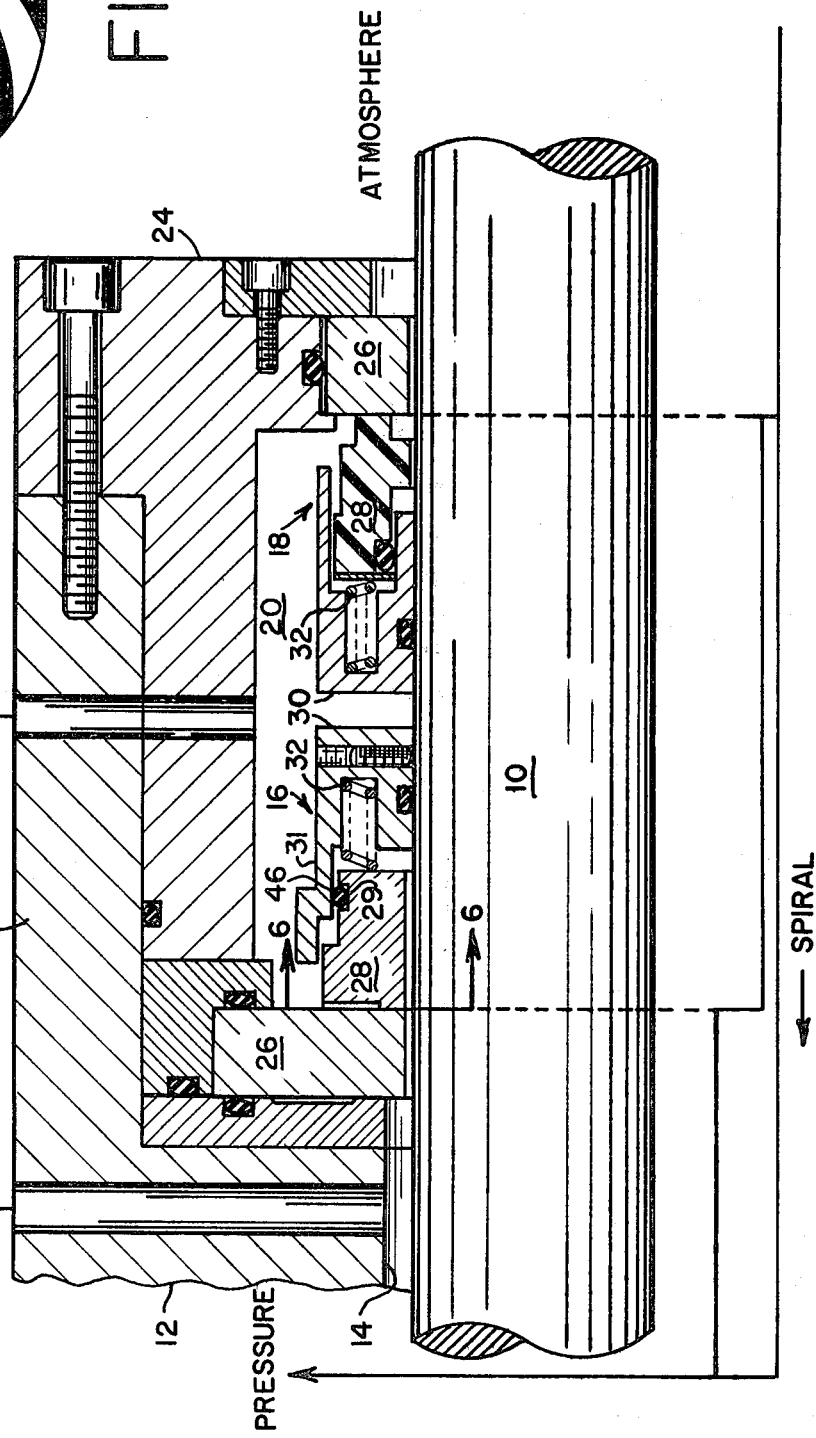

HIGH PRESSURE UPSTREAM PUMPING SEAL COMBINATION

BACKGROUND OF THE INVENTION

The present invention is a dual seal intended to seal the space between a rotating shaft and a housing against the loss of fluid under high pressure within the housing. Such seals are typically used in pumps and compressors and are of the radial end face type.

Dual seals have previously been used in such environments. These prior art seals have taken different forms and operate in different manners. The prior art seals are illustrated in FIGS. 1–4 of the attached drawings. The pressure curve below each of these seals may be used as an aid to understanding their operation. Dashed arrows indicate the direction of leakage flow while a solid arrow represents the direction of intentional pumping across the seal faces.

A common dual seal is the "double seal" arrangement of FIG. 1. Such a seal comprises two radial end face seals oriented back to back along a drive shaft (DS) within a housing (H). Each face seal has a stationary ring (S) and a rotating ring (R) with their radial faces (F) biased into engagement with A bias (B). These seals are mounted within a chamber C in the housing which contains a buffer fluid pressurized from an external source (not shown). The arrangement is referred to as a back to back orientation because the back of one rotating ring (R) is opposed to the back of the other rotating ring. As depicted by pressure diagram, the fluid pressure to be sealed is to the left of the seal and the atmosphere is to the right. During normal operation, a lubricant is circulated within the chamber of this tandem seal at a pressure that is generally 5–20 PSI above the sealed pressure. The chamber pressure is necessary to aid the bias (B) in keeping the inboard seal closed. This arrangement is most desirable when corrosive liquids are being sealed because the metal parts of the seal are isolated within a non-corrosive buffer liquid. In this arrangement the outboard seal must accommodate more than system pressure.

Another type of a dual seal is the "tandem seal" of FIG. 2. Here, the seals are mounted in the same direction. A restricted interconnection between the sealed chamber and the buffer chamber (not shown) may be used to permit sealed fluid to enter the buffer chamber at pressures up to one half the sealed pressure. Thus, each component seal may accept and seal one half of the total pressure, as shown by the pressure chart. The tandem seal has the benefit of reducing the pressure which each seal must hold, but contrary to the double seal, the metal parts of a tandem seal are exposed to the sealed liquid.

A third type of dual seal is depicted in FIG. 3 which illustrates the disclosure of U.S. Pat. No. 3,894,741. The patent states that it is directed to a special application—submersible pumps. The outside of the seal housing is immersed in water. The outboard seal is mounted in the buffer chamber C which is filled with oil. The inboard seal is also mounted in oil and has spiral pumping grooves which pump oil into the buffer chamber and past the outboard seal to oppose water leakage into the seal pump housing.

Another type of dual seal is that sold by Borg-Warner Corporation under the designation "Type GU Mechanical Seal" (see attached advertisement). In this dual seal, the inboard seal is a liquid seal while the outboard seal is a gas seal. The inboard seal precludes or limits the leakage of liquid. Liquid which does leak past the inboard seal is drained from the chamber C by taps (not shown). The outboard seal acts as a gas seal and a backup seal. In the event of failure of the inboard liquid seal, the outboard gas seal may, for a limited time, act as a liquid seal but it is not designed to run in a liquid for extended periods of time.

The above illustrations represent the common types of dual seal applications as understood by this inventor. Reference should be made to U.S. Pat. No. 3,894,741, for a more comprehensive disclosure.

Each of these common types of dual seals have leakage or pumping action in a direction outwardly of the housing. They do not have a true, second, safety seal which operates in a fluid medium without load or wear until the first primary seal fails.

SUMMARY OF THE INVENTION

To provide a seal with one or more of the desirable features not found in the prior art, my invention is a dual seal arrangement having an outboard, safety seal immersed in a buffer fluid of low pressure to avoid wear and an inboard primary seal which, during normal operation, accepts and seals the entire upstream pressure of the housing. Between these seals is a buffer zone holding the buffer fluid. The inboard seal has spiral grooves exposed to the buffer fluid for picking up and pumping this fluid across a dam in its radial face and into the upstream pressure to provide lubricity. The inboard seal is also exposed to upstream pressure and balanced in such a manner as to provide greater sealing ability with greater lubricity as the upstream pressure increases.

Accordingly, it is among the objects of my invention to provide a dual seal which
 (a) has a true fluid safety seal immersed in a fluid and is not subject to pressure or wear until the primary seal fails;
 (b) has a primary seal whose sealing effectiveness increases in response to an increase in housing pressure while providing lubrication across its face to minimize power and heat loss and wear;
 (c) has the ability to preclude or minimizes seal leakage from the housing;
 (d) has an alarm system which detects primary seal leakage;
 (e) has lower manufacturing and maintenance costs; and
 (f) eliminates the need for pressurizing the buffer fluid in excess of system pressure and the cost of auxiliary equipment to generate that pressure.

BRIEF DESCRIPTION OF THE DRAWINGS

The manner in which these and other objects of my invention are attained is stated in the following specifications and drawings in which:

FIGS. 1–4 are schematic elevational views taken in section of prior art dual seals.

FIG. 5 is an elevational view taken in section through a vertical center line of a preferred embodiment of my invention.

FIG. 6 is a side elevational view of the face of the spiral groove pumping ring.

DETAILED DESCRIPTION OF THE PREFERRED EMBODIMENT

The preferred embodiment of my invention, as depicted in FIG. 5, is installed about a rotating drive shaft 10 which passes out of a housing 12 containing high pressure fluid. My invention is intended to seal the circumferential space 14 against leakage to the atmosphere. The preferred embodiment comprises two mechanical end face seals 16 and 18 in back to back orientation. These seals are enclosed within a chamber or buffer zone 20. The chamber is defined by an annular flange 22 extending outward from the housing and a gland plate 24 bolted to the flange in any conventional manner.

The end face seal 16 and 18 operate in a fluid which is slightly pressurized. The pressure may be supplied to chamber 20 from an external pump or, as shown, from the upstream or pressure side of the seal combination. If the buffer fluid is supplied from the housing pressure, a conduit 25 may be used to interconnect the buffer chamber with the sealed liquid. The conduit should include a filter and a restrictor (as shown) to reduce the pressure.

In operation, the seal 18 normally seals the chamber against leakage of buffer fluid to the atmosphere. Since this fluid has a low pressure, the seal 18 is subjected to a small load and minimum wear. However, seal 18 should, preferably, be designed to seal the full system pressure. This permits its use as a safety seal in the event of failure of seal 16.

The seal 16 is a spiral groove pumping seal. This seal accepts the entire housing pressure. Further it pumps fluid from the buffer chamber into the upstream high pressure side of the seal. As shown below, this pumping action lubricates the seal faces and opposes loss of fluid to be sealed.

With this background, the operation of the seal can be understood. First, buffer fluid is delivered to chamber 20 at a low pressure. Seal 18 precludes loss of this fluid from the chamber 20. Seal 16 opposes loss of high pressure from within the housing through space 14. As shown by the pressure chart, seal 16 also pumps fluid from the buffer zone 20 across its radial faces and into the high pressure side of the housing.

Both seal 16 and 18 are of the mechanical end face type. Each has an annular stationary seal ring 26 sealingly mounted in the housing by o-rings as shown and constrained against rotation. Each seal also has a rotating ring 28 which surrounds and is constrained for rotation with the drive shaft 10 through a retainer 30 sealingly mounted on the drive shaft 10. Biases 32 between the rotating rings 28 and the associated retainers urge the rotating rings into contact with the stationary rings. These general aspects of each of the individual end face seals are well known in the art.

However, end face seal 16 has specific features which, together with the remaining cooperative structure attains the objects of my invention. Such is a spiral groove seal having some similarities to the seal disclosed in my co-pending patent application entitled "Low Energy Tandem Seal", Ser. No. 080,276, and the articles cited in that application. As shown in FIG. 6, the radial face 40 of rotating ring 28 has spiral pumping grooves 42 which extend into the buffer fluid. Upon rotation, these grooves 42 pick-up buffer fluid and pump it across a dam 44—the ungrooved portion of the flat face. This fluid opposes fluid leakage from the upstream side of the seal. Preferably, the width of the dam 44 is relatively small (about 15% of the total face width) and the grooves have a depth of from about 0.0001 to about 0.0003 inches.

The sealing interconnection between rotating ring 28 and its retainer 30 of seal 16 is also different from that of seal 18. The retainer 30 of seal 16 has a forward extending annular flange 31 extending over the external circumference of ring 28. A recess 29 in the external circumference carries the o-ring seal 46 precluding leakage from between the ring and the retainer. This positioning of o-ring permits high pressure fluid to act against the back of ring 28 to assist bias 32 in maintaining the engagement of the radial seal faces.

Preferably, the balance of seal 16 is from 0.7 to 1.1. It should not be less than 0.65—the balance required to permit fluid pressure to urge the seal closed. Since seal 16 is a spiral groove gap type seal, its pumping action is, in part, dependent upon the operating gap. As the pressure in the housing increases, this gap, because of the balance, decreases and the pumping action of the grooves is enhanced. Such minimizes friction and provides greater opposition to fluid leakage. Thus, the greater the pressure, the greater the sealing force between the radial faces.

Those skilled in the art will appreciate modifications of my invention. The seal 16 could be designed such that fluid is pumped across its face in either direction. The primary requirement is that the seal be arranged so that the grooves extend into the chamber 20 to pump buffer fluid into the high pressure side of the upstream seal. Similarly, seal 18 may take forms other than that of a mechanical end face seal. The alarm illustrated in the rectangular box is preferably of a pressure sensitive type and is connected to chamber 20 to detect pressure build up in the chamber which indicates a need to repair the inboard seal 16.

I claim:

1. A mechanical end face seal combination for sealing the annular space between a housing and a rotating shaft, passing there through, said seal comprising:
   (a) a first end face seal having a primary ring sealingly mounted for rotation with said shaft and a mating ring mounted in sealing engagement with said housing, said primary and secondary rings having mating, radial sealing faces;
   (b) a second end face seal positioned inboard of said first seal to define a buffer zone between said first and second seals, said second seal including a primary ring constrained for rotation with said shaft and a mating ring carried by said housing, said rings having radial faces in mating sealing engagement; one of said rings having a flat circumferential dam area on a portion of the diameter of its face and spiral grooves extending for the remaining circumferential portion of its face, said grooves being positioned to pump fluid from the buffer zone of said seal across the dam face and into the inboard high pressure side of said second seal; and
   (c) said buffer zone containing a buffer fluid to be pumped inboard of said inboard seal against the pressure of the fluid to be sealed.

2. An apparatus as recited in claim 1, in which said second end face seal has a balance of greater than 0.7 and less than 1.1

3. An apparatus as recited in claim 2, in which the dam width of said second end face seal is approximately 15% of the total width of the sealing face.

4. An apparatus as recited in claim 3, in which the spiral grooves have a depth of less than 0.0003 inches.

5. A safety seal combination for sealing the circumferential space between a housing and a rotating shaft, said seal combination comprising:
   (a) a liquid outboard seal and a liquid inboard seal, said seals being separated to define a buffer zone along said shaft within said housing;
   (b) a buffer fluid within said buffer zone; and
   (c) said second seal having spiral grooves on one of its sealing faces, said grooves being in contact with said buffer fluid and contoured for pumping said buffer fluid towards the pressurized, inboard side of said inboard seal to aid said seal in precluding leakage of fluid from the pressurized side of said inboard seal into said buffer zone.

6. A seal combination as recited in claim 5, in which said outboard seal is of the radial end face type.

7. A seal combination as recited in claim 6, in which said face of the inboard seal having said spiral grooves is provided with a flat circumferential dam adjacent the inboard side of said face.

8. A seal combination as recited in claim 5, in which the buffer fluid in said buffer zone has an operating pressure substantially less than that of the fluid within the housing so as to prolong the life of the outboard.

9. A seal combination for sealing the circumferential space between a housing and a rotating shaft, said seal combination comprising:
   (a) an outboard seal mounted in said annular space;
   (b) an inboard seal mounted in said annular space and positioned axially of said outboard seal to define a low pressure buffer chamber; and
   (c) means carried by said inboard seal for pumping a fluid from said low pressure buffer chamber towards the inboard, high pressure side of said inboard seal in opposition to fluid leakage from said high pressure side.

10. An apparatus as recited in claim 9, in which said outboard seal is a radial end face seal.

11. An apparatus as recited in claim 9, in which said inboard seal is a radial end face seal and comprises:
    (a) a primary mating ring having a circumferential dam on the high pressure side of said face and spiral grooves on said face extending from said dam to said low pressure buffer chamber for pumping fluid from said buffer chamber into the high pressure side of the seal.

12. An apparatus as recited in claim 11, in which the quality of fluid pumped from said buffer chamber into said high pressure side varies directly and in proportion to the pressure in the high pressure side of said seal.

* * * * *